(12) United States Patent
Hsin

(10) Patent No.: US 8,132,300 B2
(45) Date of Patent: Mar. 13, 2012

(54) GASKET FOR FASTENING THE AUTOMOTIVE SAFETY BELT

(76) Inventor: Yu Jen Hsin, Tainan (TW)

( * ) Notice: Subject to any disclaimer, the term of this patent is extended or adjusted under 35 U.S.C. 154(b) by 725 days.

(21) Appl. No.: 12/167,296

(22) Filed: Jul. 3, 2008

(65) Prior Publication Data

US 2009/0007397 A1  Jan. 8, 2009

(30) Foreign Application Priority Data

Jul. 4, 2007 (TW) .............................. 96124230 A

(51) Int. Cl.
*A44B 11/10* (2006.01)

(52) U.S. Cl. ........................................ 24/163 R; 24/171

(58) Field of Classification Search ............... 24/163 R, 24/198, 171, 194; 280/808, 801.2, 805, 806, 280/807; 297/483
See application file for complete search history.

(56) References Cited

U.S. PATENT DOCUMENTS

| 3,695,697 | A | * | 10/1972 | Stoffel | 297/479 |
| 5,139,282 | A | * | 8/1992 | Mein | 280/808 |
| 2004/0150211 | A1 | * | 8/2004 | Pi | 280/808 |

FOREIGN PATENT DOCUMENTS

| FR | 2626538 A1 | * | 8/1989 |
| FR | 2682655 A1 | * | 4/1993 |
| JP | 61291248 A | * | 12/1986 |
| TW | 350413 | | 1/1999 |

OTHER PUBLICATIONS

Office Action for case TW096124230 issued by Taiwan Intellectual Property Office on Jun. 2, 2010.

* cited by examiner

*Primary Examiner* — James Brittain
(74) *Attorney, Agent, or Firm* — Ming Chow; Sinorica, LLC

(57) ABSTRACT

A gasket for fastening the automotive safety belt is disclosed. A plastic material is applied to form a one-piece body comprising a fixing part, a flexible part and a plug part. The plug part of the gasket is inlet into the hole of the suspension sheet of the safety belt for fastening the safety belt so as to avoid the safety belt rolling automatically to bind the human body so close that the chest are oppressed uncomfortably. In addition, the gasket mounted on the outer surface of the buckle of safety belt is made of plastic materials. Even the gasket is touched with human body in use, to adjust and to fasten the safety belt will not result in the human body being hurt from impact. It is much safer for utility.

3 Claims, 5 Drawing Sheets

GASKET FOR FASTENING THE AUTOMOTIVE SAFETY BELT

BACKGROUND OF THE INVENTION (a) Field of The Invention

The present invention is related to a gasket for fastening the automotive safety belt, especially a gasket made of plastic materials for fastening the length of the safety belt which is stretched out and for avoiding uncomfortably oppressing the chest from binding of the safety belt. Furthermore, due to the gasket is made of plastic materials and the part revealed to touch human body does not cause injury from impact, it is more safety in use.

(b) Description of The Prior Art

The arrangement of the safety belt as taking vehicles is provided to binding human body to avoid serious injuries from impact by body shifting in traffic accident. The safety belt arranged in vehicles is provided with the function of automatically furl which enables the safety belt retracted automatically to the housing of the safety belt. But the function of automatically furl makes the safety belt retracted automatically to tie up the human chest, it brings people feeling of aches and oppression. To solve the problem, a slip stopper for safety belt is designed to fix the length of the safety belt after adjusting. However, it is necessary to take the clip off to retract the safety belt automatically. If the clip is not taken off, it leads to loss the clip easily and it is not convenient to pick up.

To solve above-mentioned problem, described as the TW PAT NO. 350413 "Latch for locking the safety belt" is claimed. The length lengthened of the automotive safety belt is fastened by the latch to solve the problem that the uncomfortably oppression of human chest as users fastening the safety belt. Besides, when the car accident is happened with low speed driving, the automatic locking device of safety belt is still triggered. The structure of the latch comprises a block which is a curved broadside body with a thick head and a thin end. The thickness of the head of the block can be adjusted to provide for passing through the aperture of the buckle. A plurality of hangers formed as a hooked structure can be arranged on the side of the block separately or be hanged in the inner side of the aperture by the buckle.

Though the above-mentioned patent can be applied to hang the block on the buckle of the safety belt by the hangers in order to make sure not dropped if loosened. And, the head of the block can be inserted into the aperture of the buckle to adjust the length of the safety belt fastened with a latch to avoid the uncomfortable oppression of the human chest due to the safety belt retracted automatically. However, the head of the block is inserted into the aperture of the buckle to fasten the safety belt. The rigid block is still revealed and suspended behind the neck with a monolithic body. Thus, the vehicles are impact accidentally while driving. The crash between the rigid body of the block and the human body still makes people injured accidentally.

SUMMARY OF THE INVENTION

The object of the prevent invention is to provide a plastic and flexible gasket for fastening the safety belt. The plastic and flexible gasket not only adjusts the length of the safety belt without having a rigid body revealed and crashed, but also makes a better effort in a safe way to fastening the safety belt.

To achieve the above-mentioned object of the characteristic structure and the technique contents, the prevent invention relates to a gasket for fastening the safety belt. The gasket made of plastic materials is formed a one-piece body comprising a fixing part, a flexible part and a plug part. A stopping element mounted on one side of the fixing part is arranged on the surface of buckle to fasten the safety belt.

With the design, the length of the safety belt can be adjusted to fasten the safety belt when taking vehicles. The plug part of the gasket is inlet into the hole of the suspension sheet of the safety belt for fastening the safety belt so as to avoid the safety belt rolling automatically to bind the human body so close that the chest are oppressed uncomfortably. In addition, the gasket mounted on the outer surface of the buckle of safety belt is made of plastic materials. Even the gasket is touched with human body in use, to adjust and to fasten the safety belt will not result in the human body being hurt from impact. It is much safer for utility.

DETAILED DESCRIPTION OF THE PREFERRED EMBODIMENTS

Figure 1:
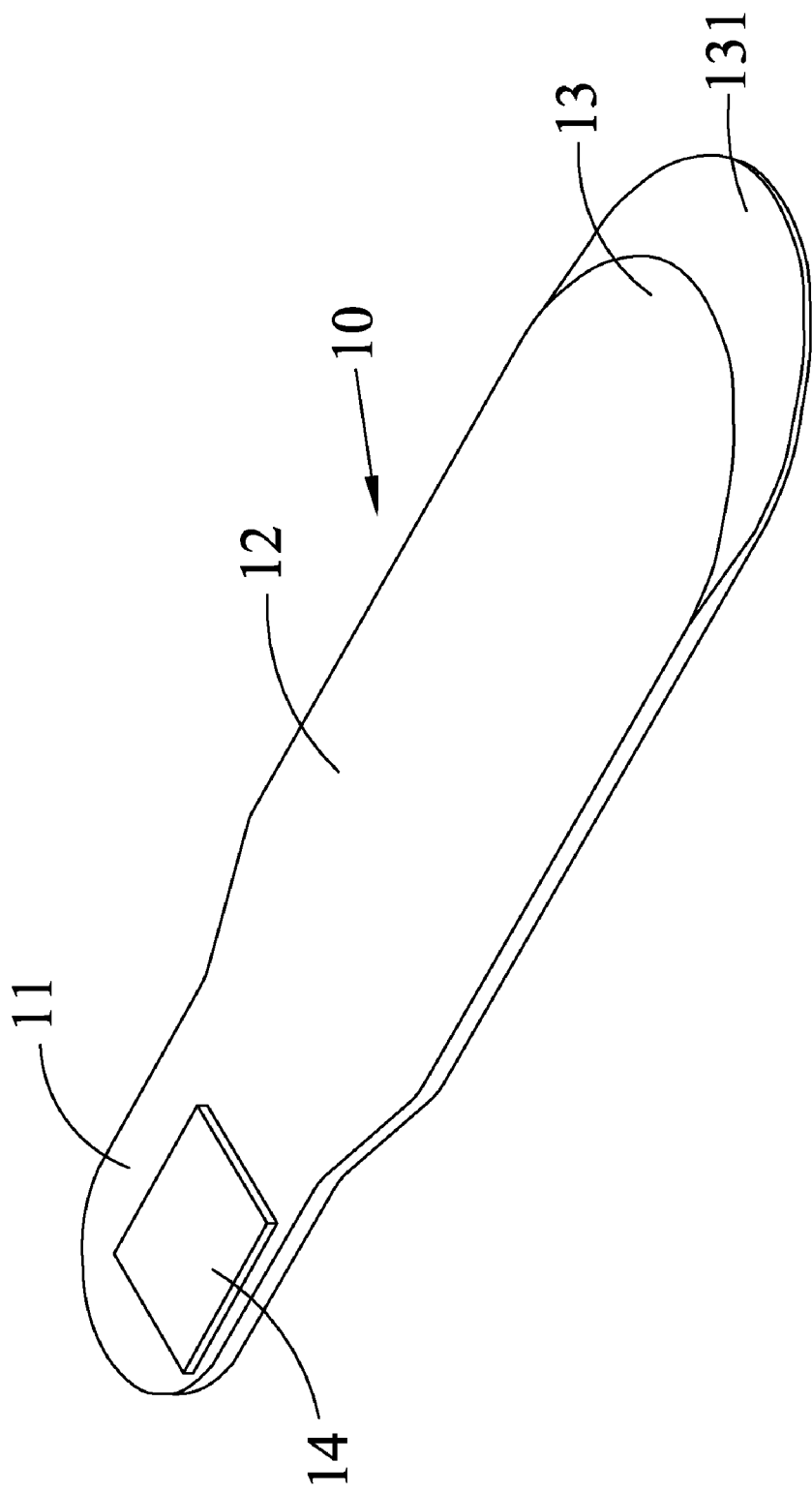
FIG. 1 is a perspective view of the present invention.
Figure 2:
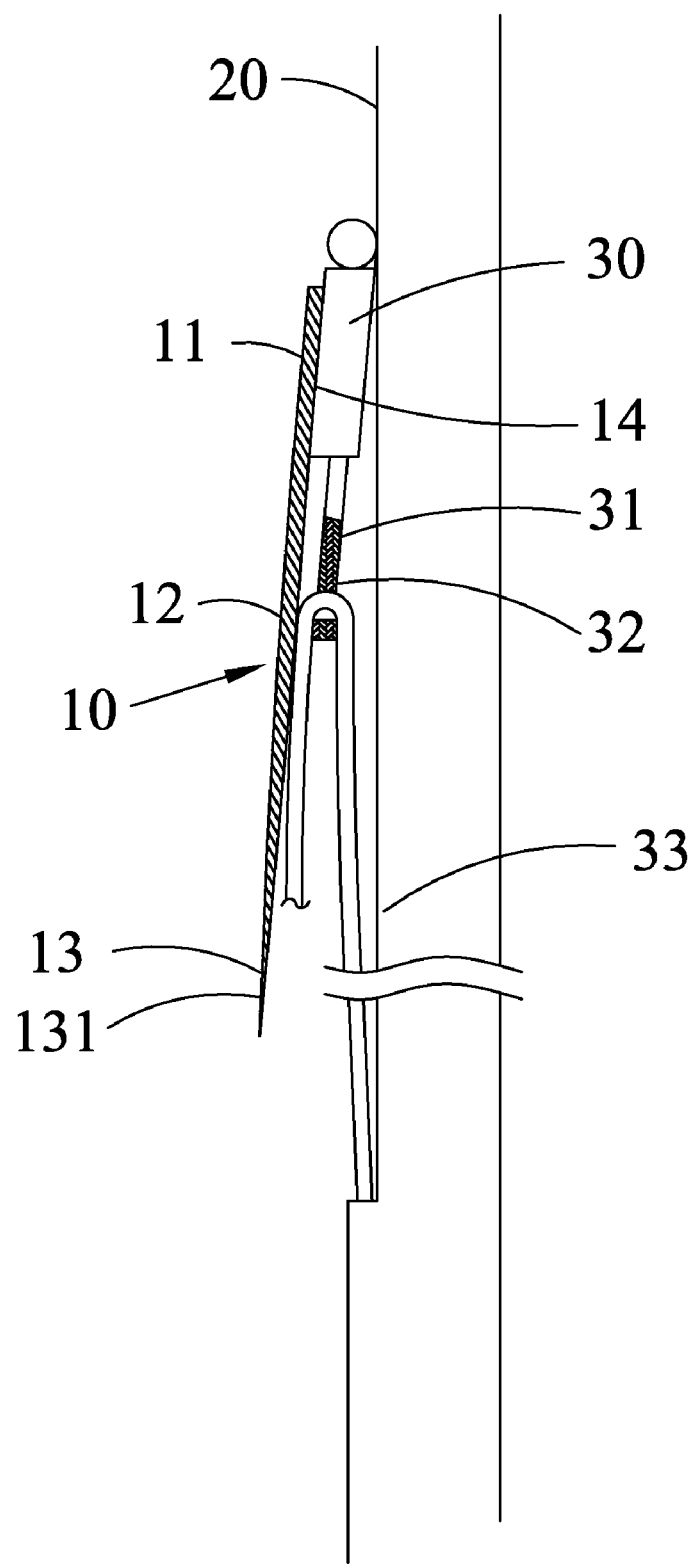
FIG. 2 is a front cross-sectional view of the hanger with the safety belt arranged on the wall of the vehicles of the present invention.

Referring to the FIG. 1 and FIG. 2 cooperatively, wherein the prevent invention is related to a gasket 10 for fastening the safety belt. The gasket made of plastic materials is formed a one-piece body comprising a fixing part 11, a flexible part 12 and a plug part 13. A stopping element 14 mounted on one side of the fixing part 11 is arranged on the surface of the buckle 30 to fasten the safety belt 30.

Said stopping element can be a fixing element such as twin adhesive, VELCRO or screw.

Said buckle 30 of the safety belt 33 is arranged on the wall 20 of the housing of the vehicles, and a suspension sheet 31 is arranged on the bottom side of the buckle 30. A through hole 32 is built on the suspension sheet 31, and is provided the safety belt passed through and hanged on the underside of the buckle 30. The stopping element 14 arranged on the surface of the buckle 30 is provided the gasket 10 adjacent to the outer side of the suspension sheet 31 of the bottom of the buckle 30. Then, the flexible part 12 can be bent to have the plug part 13 inserted into the through hole 32 of the suspension sheet 31.

A ramp 131 is formed on the edge of said plug part 13 of the gasket 10 to enable the plug part 13 of the gasket 10 inserted into the aperture between the through hole 32 and the safety belt 33 easily so as to fasten the safety belt by retaining the safety belt 33.

Figure 3:
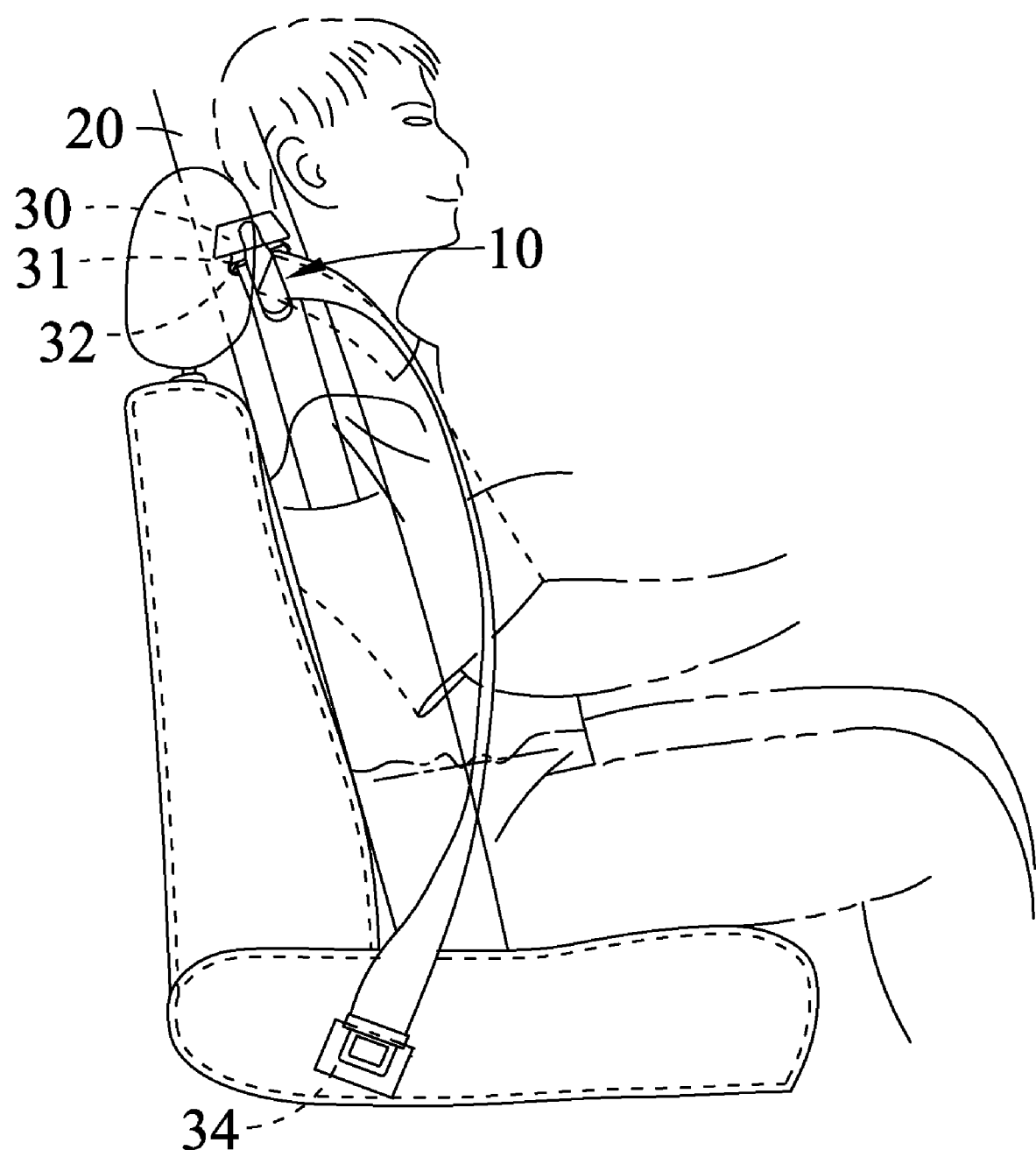
FIG. 3 is a front plan schematic view of the hanger with the safety belt arranged on the wall of the vehicles of the present invention.
Figure 4:
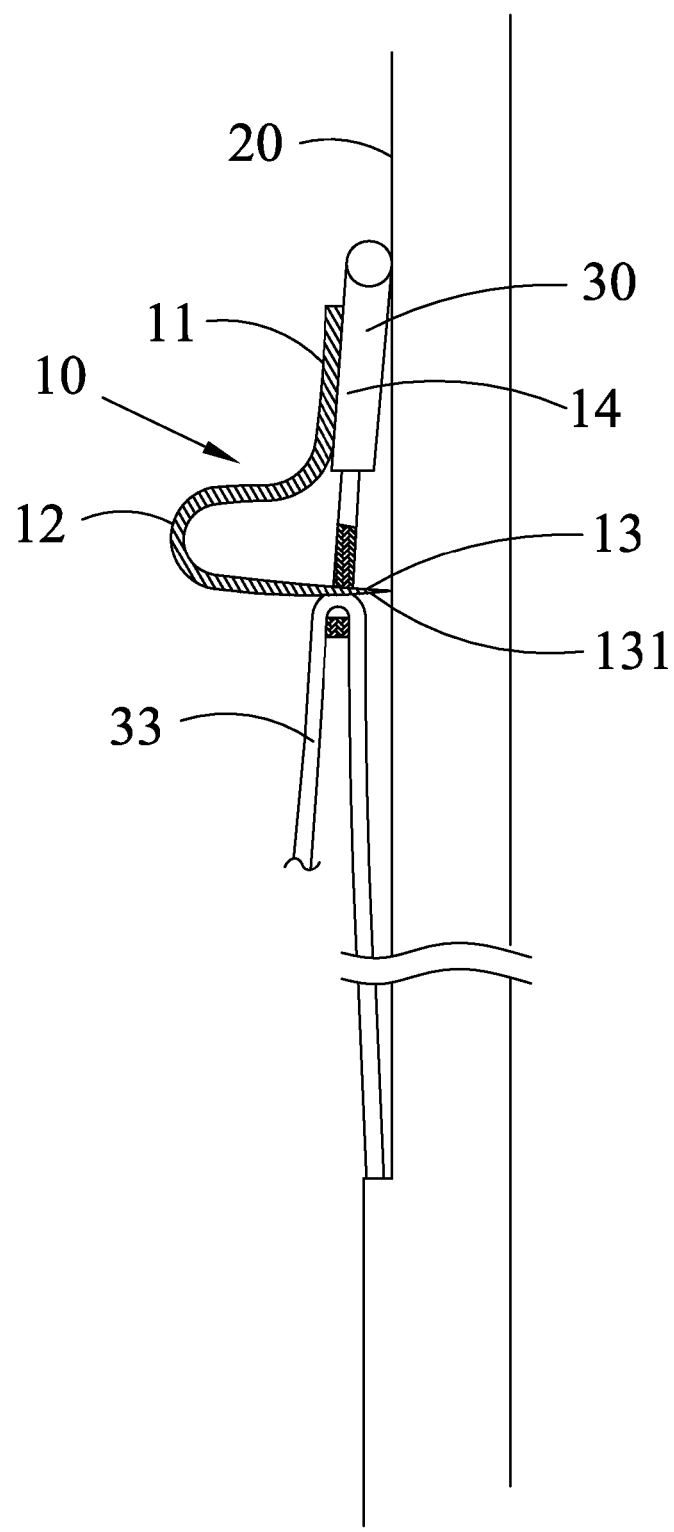
FIG. 4 is a schematic diagram of the suspension sheet inserted into the through hole of the present invention.
Figure 5:
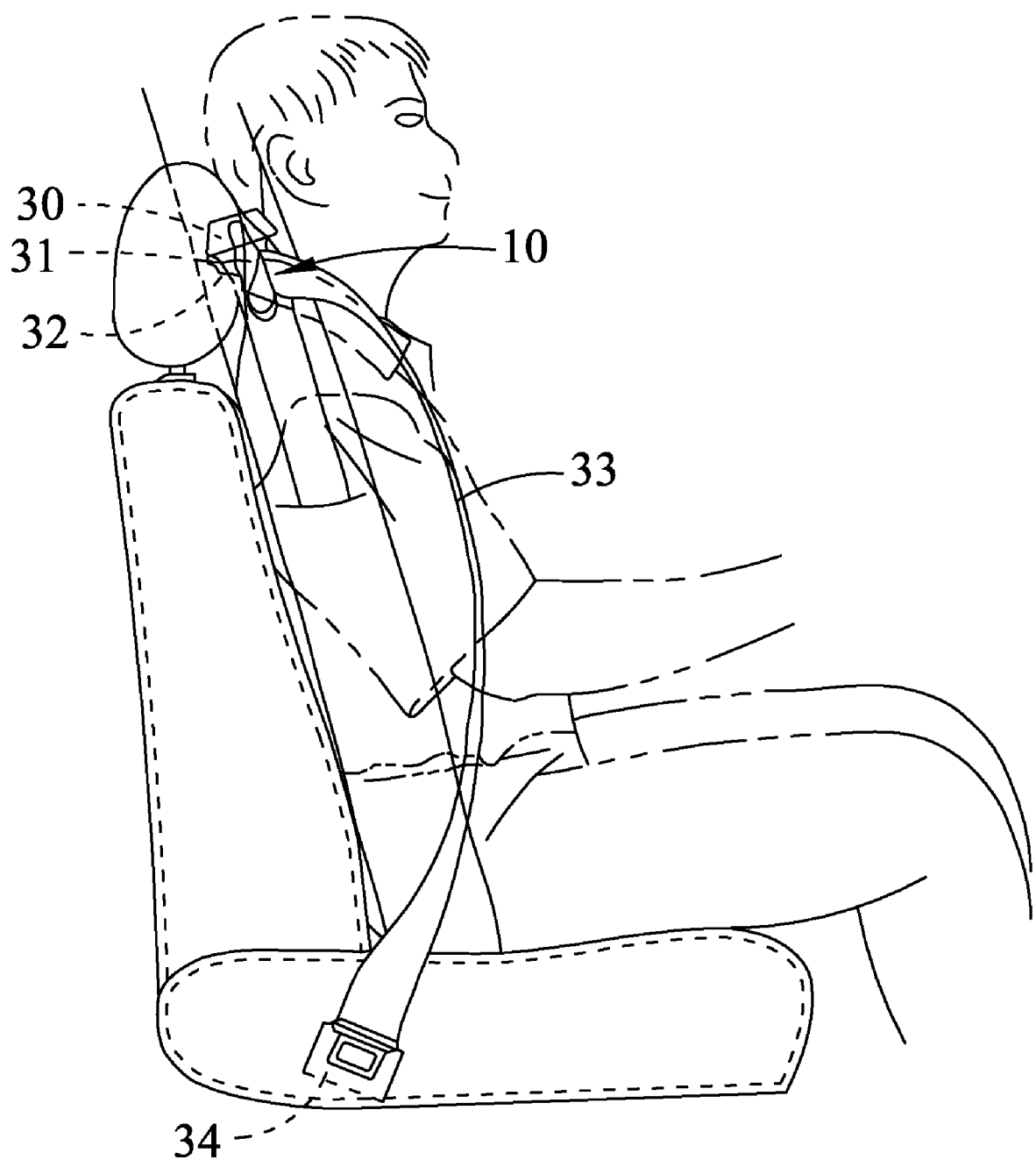
FIG. 5 is a schematic diagram of the safety belt adjusted after taking vehicles and fastening the safety belt of the present invention.

Referring to the FIG. 3, FIG. 4 and FIG. 5 cooperatively, the operation of the prevent invention is related to fasten the safety belt 33 while taking vehicles. After the safety belt clamped in the stalk 34, to pull the safety belt 33 makes a proper length and the plug part 13 of the gasket 10 is inserted into the through-hole 32 of the suspension sheet 31 for fastening the safety belt 33 by the gasket 10. Therefore, the users will not be oppressed from the retraction automatically of the safety belt 33 so as to avoid the uncomfortable oppression of the chest by the safety belt 33.

Because the gasket of the prevent invention made of plastic materials is formed a soft and flexible body, the flexible part 12 can be bent to have the plug part 13 inserted into the through hole 32 of the suspension sheet 31. Even if the gasket 10 emerged is touched with the human body, it will not get injured.

As a result, through a detail description of above characteristic structure and the technique contents, the prevent invention clearly characters on that to provide a gasket for fastening the safety belt. The gasket made of plastic materials is formed a one-piece body comprising a fixing part, a flexible part and a plug part. A stopping element mounted on one side of the fixing part is arranged on the surface of buckle to fasten the safety belt. Therefore, the length of the safety belt can be adjusted to fasten the safety belt when taking vehicles. The plug part of the gasket is inlet into the hole of the suspension sheet of the safety belt for fastening the safety belt so as to avoid the safety belt rolling automatically to bind the human body so close that the chest are oppressed uncomfortably. In addition, the gasket mounted on the outer surface of the buckle of safety belt is made of plastic materials. Even the gasket is touched with human body in use, to adjust and to fasten the safety belt will not result in the human body being hurt from impact. It is much safer for utility.

What is claimed is:

1. A gasket for fastening the safety belt which provides to fasten the length of the automotive safety belt, said gasket formed a one-piece body comprising:

a fixing part arranged on one side of said one-piece body, a plug part arranged on the other side of said one-piece body and having a ramp on an edge thereof, and a flexible part arranged between said fixing part and said plug part, wherein said gasket is made of plastic materials; said fixing part, said plug part and said flexible part are formed integrally together to form a strip shape having a flexible property; said fixing part further comprises a stopping element which provides said gasket fastening to a buckle of said automotive safety belt, and said plug part is inserted into a through hole of a suspension sheet of said safety belt by the ramp.

2. The gasket as claim 1, wherein said stopping element is a twin adhesive.

3. The gasket as claim 1, wherein said stopping element is a screw.

\* \* \* \* \*